GEORGE SPRINKEL.
Improvement in Stone Puller.

No. 121,820.  Patented Dec. 12, 1871.

Witnesses:
E. Wolff
Francis McArdle

Inventor:
Geo. Sprinkel
Per ————
Attorneys.

UNITED STATES PATENT OFFICE.

GEORGE SPRINKEL, OF NORTH LEVERETT, MASSACHUSETTS.

IMPROVEMENT IN STONE-PULLERS.

Specification forming part of Letters Patent No. 121,820, dated December 12, 1871.

*To all whom it may concern:*

Be it known that I, GEORGE SPRINKEL, of North Leverett, in the county of Franklin and State of Massachusetts, have invented a new and Improved Stone-Puller; and I do hereby declare that the following is a full, clear, and exact description thereof, which will enable those skilled in the art to make and use the same, reference being had to the accompanying drawing forming part of this specification, in which—

Figure 1:
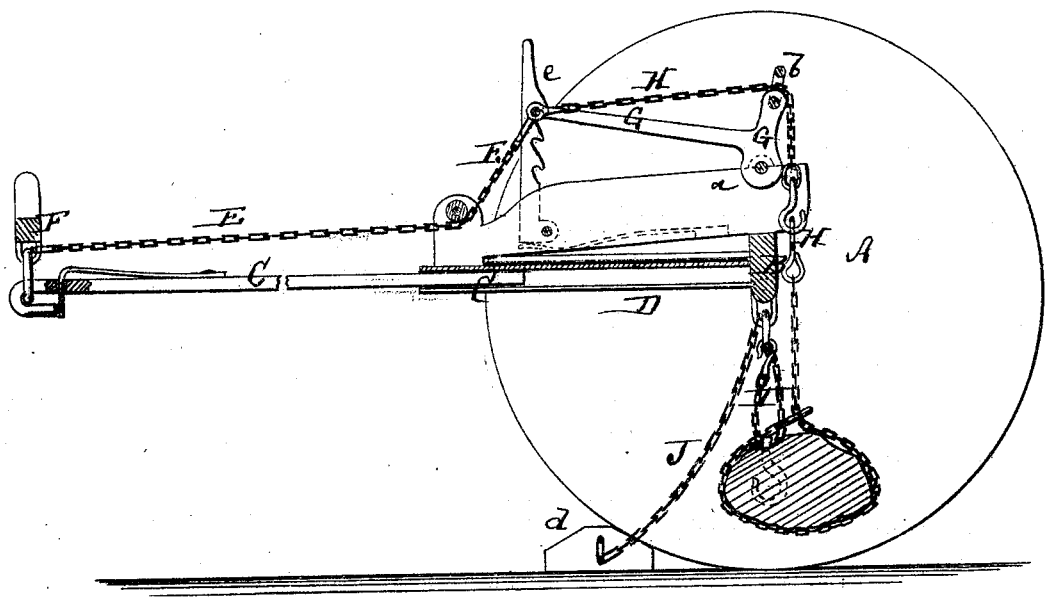
Figure 2:
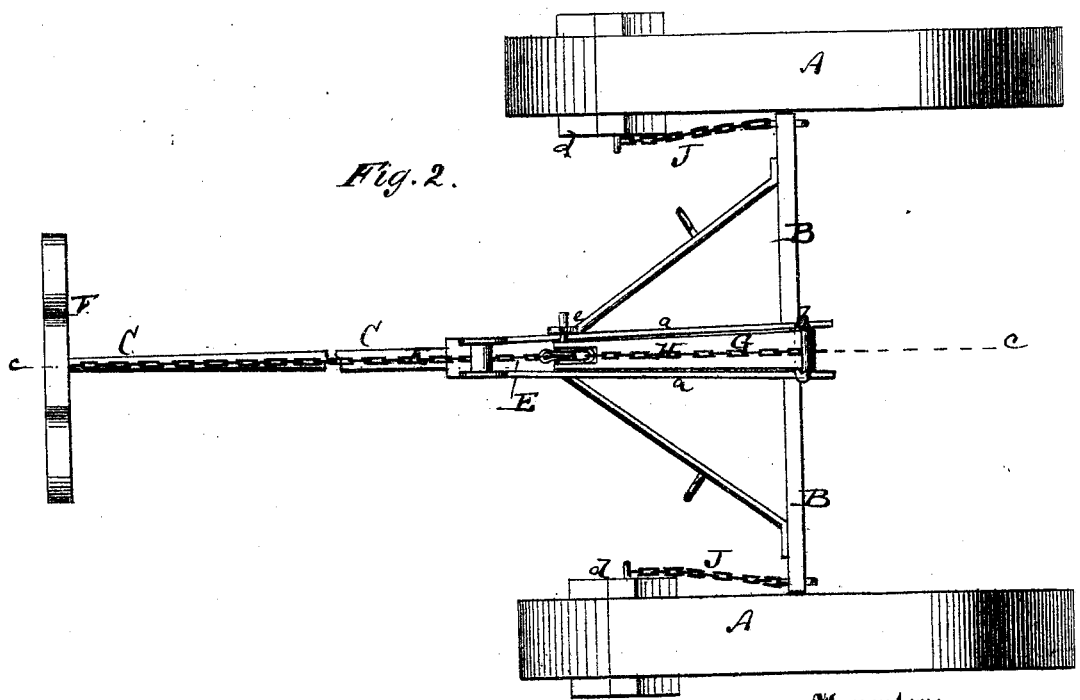

Figure 1 represents a vertical section of my improved stone-puller taken on the plane of the line $c$ $c$, Fig. 1. Fig. 2 is a top view of the same.

Similar letters of reference indicate corresponding parts.

This invention relates to a new vehicle for lifting heavy stones and other things from the ground and conveying them a suitable distance. The invention consists in combining a sliding tongue with a draft-chain and elbow-lever, as hereinafter more fully described.

A A in the drawing are the wheels hung on the ends of an axle, B. C is the tongue of the vehicle. Its back end is held in a recess or socket provided for its reception in a projecting bar, D, of the axle. A chain, E, which is, with its front end, secured to a yoke or neck-yoke, F, is, with its rear end, fastened to the long arm of an elbow-lever, G, that is pivoted between ears $a$ $a$, projecting from the axle. The lifting-chain H is also secured to the long arm of the lever G, and passes through a loop, $b$, formed on the short arm of the same lever. Suitable guide-chains I I are suspended from the axle, and also other chains, J J, which hold brake-blocks $d$ $d$.

When the machine is to be used for lifting, the blocks $d$ are placed in front of the wheels A to prevent them from turning. The animals which are yoked to the tongue are then started ahead and swing the lever G, whose long arm was first in a vertical position. In being thus moved the lever G causes the chain H to hang on the end of its short arm, and thereby carries it up with the load. A very powerful leverage is thus obtained. When the long arm of the lever has been swung down it is caught and the load locked in its elevated position by means of a spring-catch, $e$. The tongue slides outward without drawing on the axle, while power is thus applied for lifting, but is otherwise locked in the bar $d$ by a suitable bolt or pin.

Having thus described my invention, I claim as new and desire to secure by Letters Patent—

The combination of the sliding tongue C with the draft-chain E, elbow-lever G, and lifting-chain H, all arranged to operate substantially as herein shown and described.

GEORGE SPRINKEL.

Witnesses:
   E. A. GOULD,
   S. S. GRAVES.

(31)